United States Patent [19]
Lazaridis

[11] 3,947,244
[45] Mar. 30, 1976

[54] HEAP PIPE VACUUM FURNACE
[75] Inventor: Lazaros J. Lazaridis, Lincoln, Mass.
[73] Assignee: Thermo Electron Corporation, Waltham, Mass.
[22] Filed: Nov. 20, 1973
[21] Appl. No.: 417,653

Related U.S. Application Data
[63] Continuation of Ser. No. 186,605, Oct. 5, 1971, abandoned.

[52] U.S. Cl. .................. 432/205; 432/91; 165/105
[51] Int. Cl. ......................... F27b 5/04; F28d 15/00
[58] Field of Search ........ 165/105; 432/90, 91, 205; 13/31

[56]   References Cited
       UNITED STATES PATENTS

| | | | |
|---|---|---|---|
| 2,237,519 | 4/1941 | Bolling | 432/91 X |
| 2,705,137 | 3/1955 | Haltmeier | 432/205 X |
| 3,160,404 | 12/1964 | Potenzo et al. | 13/31 X |
| 3,209,062 | 9/1965 | Scholz | 165/105 X |
| 3,257,492 | 6/1966 | Westeren | 13/31 |
| 3,270,250 | 8/1966 | Davis | 165/105 X |
| 3,378,449 | 4/1968 | Roberts et al. | 165/105 X |
| 3,613,774 | 10/1971 | Bliss, Jr. | 165/105 X |
| 3,677,329 | 7/1972 | Kirkpatrick | 165/105 |
| 3,712,053 | 1/1973 | Kofink | 165/105 X |

Primary Examiner—Albert W. Davis, Jr.
Attorney, Agent, or Firm—James L. Neal

[57]   ABSTRACT

A vacuum furnace heats articles by radiation from a condenser portion of a heat pipe. The heat pipe further includes an adiabatic portion passing through the enclosing wall of the furnace and an evaporator portion outside the enclosure. The evaporator portion is preferably heated by a gas-fired burner which may surround it, and the heat pipe acts as a flux converter accepting heat outside the enclosure and delivering heat inside the enclosure to the articles to be heated. The condenser portion of the heat pipe may be panel-shaped and is disposed adjacent the articles to be heat-treated. In the more elaborate forms of the invention involving condenser panels, the condenser panel, or each condenser panel where several heat pipes are used, is a cylindrical section which partially, or substantially completely, surrounds the articles. The evaporator portion and the condenser portion of the heat pipe are connected by the adiabatic portion which is so arranged that heat loss is minimized at the point where the heat pipe passes through the furnace enclosure.

11 Claims, 5 Drawing Figures

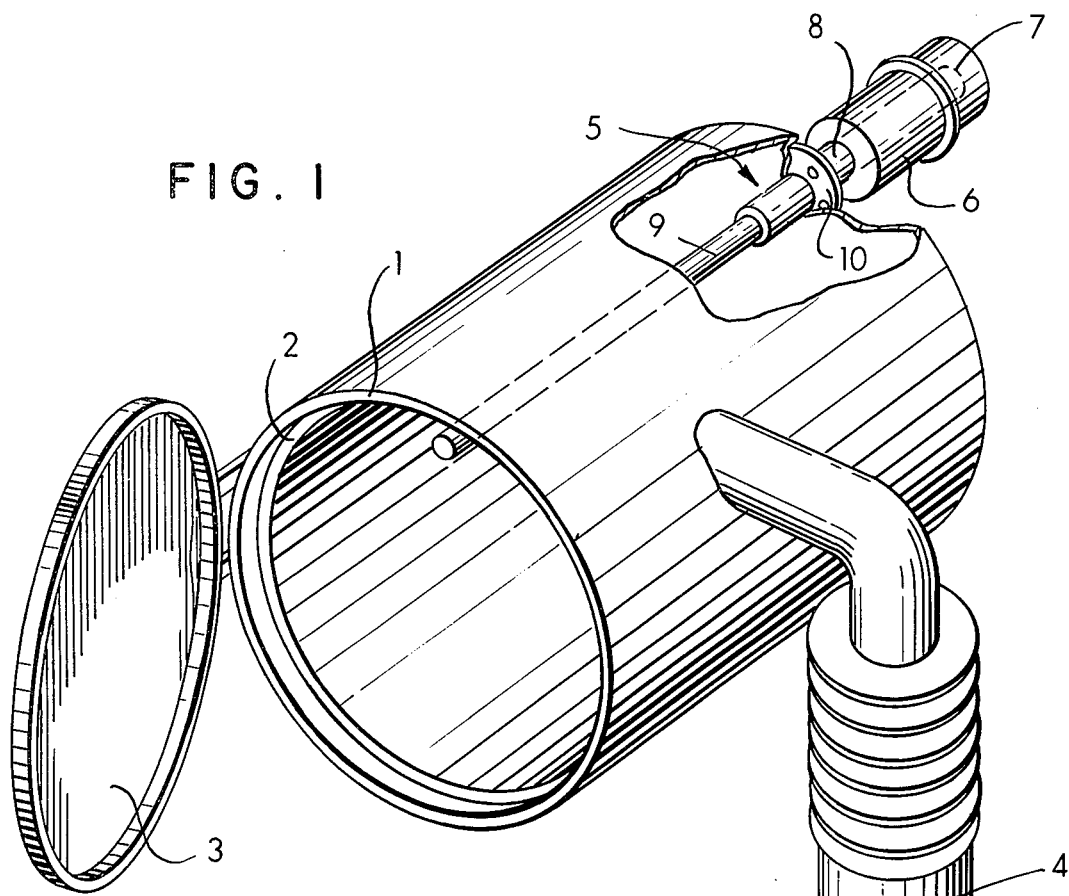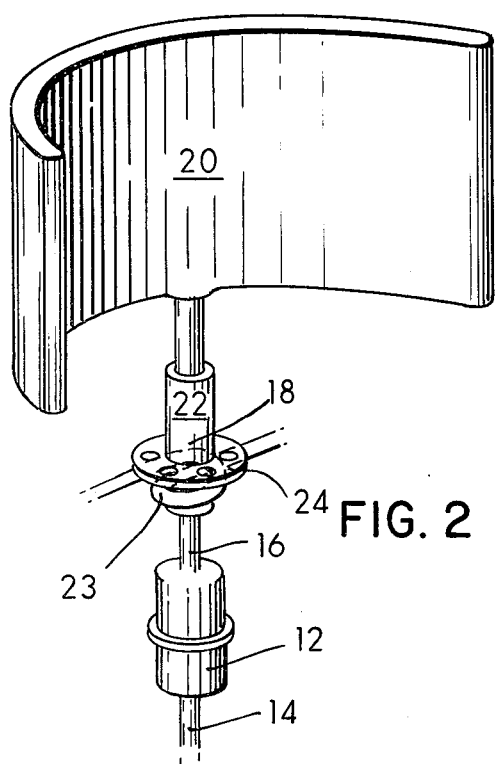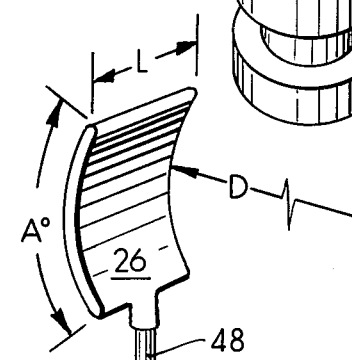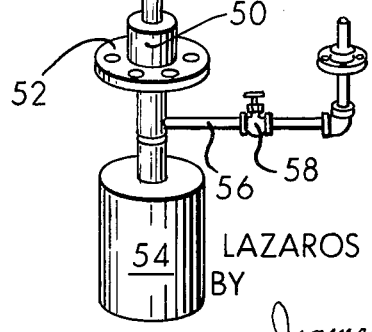

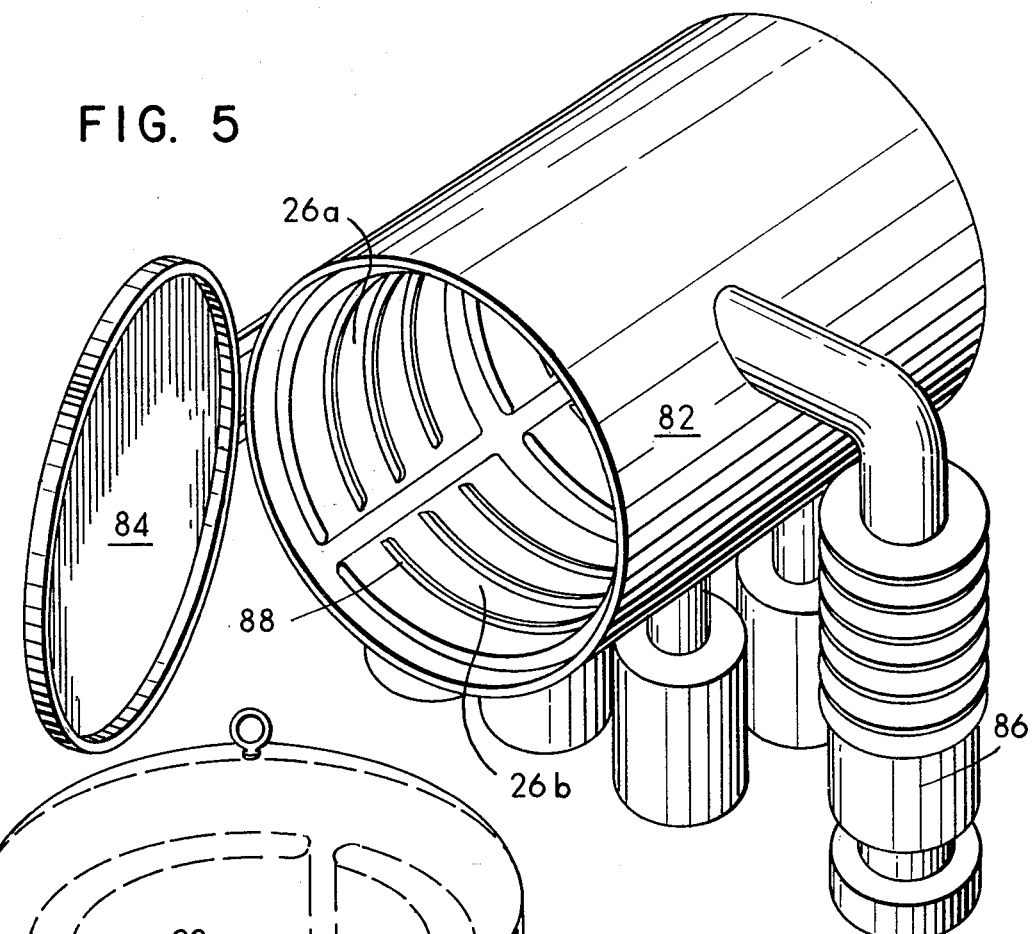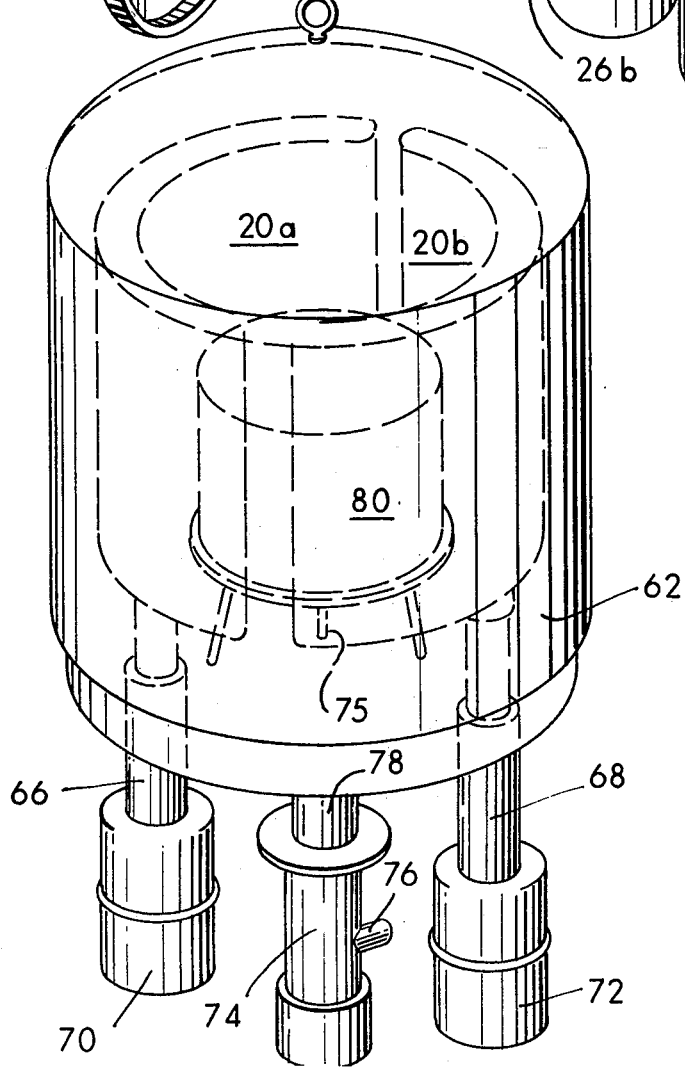

HEAP PIPE VACUUM FURNACE

This is a continuation of application Ser. No. 186,605, filed Oct. 5, 1971, now abandoned.

BACKGROUND OF THE INVENTION

Vacuum furnaces are used to heat material under conditions requiring an inert atmosphere or a vacuum, frequently to avoid oxidation or other deleterious effects. The heat-treating and brazing of metals and the removal from material of gases absorbed or adsorbed thereinto are examples of procedures in which a vacuum furnace is often required.

Generally, an enclosure is evacuated by means of a diffusion pump or other system for reducing pressure, and provision is made to heat the articles contained in the enclosure. Most commonly, such vacuum furnaces are heated with electric resistance heaters so arranged that heat is radiated to the workpiece. Alternatively, the workpiece may be heated directly or indirectly with an RF induction coil. Direct heating is possible where the workpiece is of a material in which eddy currents can be set up, and indirect heating is achieved by interposing an RF interceptor which is heated by the induced eddy currents and which then radiates heat to the workpiece.

There are certain disadvantages attendant upon the use of conventional electric heating of the types described in vacuum furnaces. For one thing, the cost of electricity is relatively high as compared to the cost of other sources of heat energy such as gas or fossil fuel. Furthermore, it is difficult to obtain favorable heating and temperature distribution in or on the articles within the furnaces using known electrical heating systems. The principal objects of the present invention are to increase the efficiency of vacuum furnaces and to lower the cost of their operation.

SUMMARY OF THE INVENTION

At the heart of the present invention is a heat pipe which is so configured that energy, preferably derived from the combustion of gas, is delivered efficiently in the form of heat to a workpiece or articles to be heated. The heat pipe in accordance with well-known principles of heat pipe technology, has an evaporator portion which is preferably located within a burner in which the combustion of gas takes place. It also has an adiabatic portion which passes through the wall of a furnace, that wall being of heat-shielding material. The adiabatic portion of the heat pipe leads to a condenser portion within the furnace. In certain forms of the invention, the condenser portion is in the form of a panel and a plurality of heat pipes is used. The condenser portion panel may be of cylindrical section. Also, when a plurality of heat pipes are used, the panels are desirably arranged to form an enclosure. With the enclosure, a grid or other suitable fixture is provided to support articles to be heat-treated.

The enclosure preferably includes a cover which is also made of heatshielding material, and which may be used to complete a vacuum-tight enclosure. Provision is made to evacuate the enclosure by means of a vacuum line which connects the interior of the enclosure to a diffusion pump or other suitable gas-evacuation system.

The principles involved in heat pipe construction are essentially those described in the article by T. P. Cotter entitled "Theory of Heat Pipes," Los Alamos Scientific Laboratory, LA-3246-MS, 1965; the article by P. K. Shefsick and D. M. Ernst entitled "Heat Pipe Development for Thermionic Applications," 4th IECEC Conference, Washington, D.C., 1969; the article by H. Cheung entitled "A Critical Review of Heat Pipe Theory and Applications," University of California, Livermore, California, UCRL-50454, July 1968; the article by Feldman, Jr. and Whiting in *Mechanical Engineering* of February 1967, and the article by Eastman in the May 1968 issue of *Scientific American*.

BRIEF DESCRIPTION OF THE DRAWINGS

For a better understanding of the present invention, together with other objects, features, and advantages, reference should be made to the appended drawings in which:

FIG. 1 is a prespective view of a vacuum furnace constructed in accordance with this invention;

FIG. 2 is a view in perspective of one form of heat pipe built in accordance with the invention;

FIG. 3 is another form of heat pipe useful in a vacuum furnace;

FIG. 4 is a prespective view of vacuum furnace utilizing heat pipes of the type shown in FIG. 2; and FIG. 5 is a perspective view of a commercial vacuum furnace utilizing heat pipes of the type illustrated in FIG. 3.

DETAILED DESCRIPTION OF THE DRAWINGS

The vacuum furnace of FIG. 1 incorporates an enclosure 1 having heat shielding 2 and a hinged cover 3. A diffusion pump 4 produces the desired vacuum within the enclosure 1 and heat is applied by the heat pipe means 5. The heat pipe means 5 is associated with a furnace 6 and includes an evaporator portion 7 extending into the furnace 6 an adiabatic portion 8 passing through the wall of the enclosure 1, and a condenser portion 9 within the enclosure. The adiabatic portion is equipped with sleeve and flange means 10 where it passes through the wall of the enclosure 1. If desired, the condenser portion 9 may be appropriately treated to enhance its radiant emissivity.

In operation, the furnace 6 evaporates working fluid in the evaporator section 7 of the heat pipe. The vaporized working fluid passes through a substantially adiabatic section 8 of the heat pipe and condenses in the condenser section 9 where an amount of heat functionally related to the latent heat of vaporization of the working fluid is transferred to the interior of the enclosure 1. As is well known in connection with heat pipe technology and understood from the foregoing publications, the heat pipe operates substantially isothermally, the condenser section thereby providing an isothermal radiating surface. Condensed working fluid is then returned to the evaporator section 7 by appropriate pumping means, such as a capillary structure, within the heat pipe.

Constructional details of certain elements of the heat pipe means 5 and other embodiments of the invention will be discussed in connection with FIGS. 2 through 5.

In the lower portion of FIG. 2, there is shown in outline a burner 12 which may be a high-heat-flux density burner which is gas-fired, the fuel-mix being introduced through a line 14. The burner is preferably ring-shaped with its products of combustion being directed inwardly to surround and impinge upon the evaporator portion 16 of a heat pipe. Within the evaporator portion 16 of the heat pipe is a working fluid, such as sodium, potassium, various organic oils or silicon based oils and the like, in liquid from which may be evaporated by the application of heat. As is well known in heat pipe technology, evaporated working fluid is driven from the evaporator portion through a substantially adiabatic portion 18 to a condenser portion 20. The adiabatic portion 18 is provided with an insulating sleeve 22 and a flange 24 at the point where it is designed to pass through the wall of a furnace, as will be explained in greater detail hereinbelow. Though not essential in all circumstances, it may sometimes be desirable to supply cooling means 23 adjacent the flange 24. The condenser portion 20 is in the shape of a panel and preferably a panel formed as a cylindrical section, the axis of the cylinder being in a vertical plane.

In the condenser portion 20 of the heat pipe, the fluid within the heat pipe condenses before returning to the evaporation portion. In condensing it gives off great quantities of heat which is radiated by the condenser portion to raise the temperature of bodies upon which the radiation impinges. For purposes of the present invention, the concave surface of the condenser portion, which is to be directed toward the material to be heated, is preferably treated to enhance radiant emissivity. Such treatment may consist of applying thereto one of the emissivity enhancing coatings, one example of which is cromium oxide ($Cr_2O_3$). On the other hand, the convex surface of the condenser portion is preferably covered with an insulating material to decrease radiation from that surface. The insulating material may be of any type ordinarily appropriate for use in vacuum furnaces. Examples of insulation are carbon blankets and insulation marketed under the name MULTI-FOIL by Thermo Electron Corporation of Waltham, Massachusetts.

In FIG. 3, a heat pipe similar to that of FIG. 2 is illustrated. However, in this instance, the axis of the cylindrical condenser portion 26 is horizontal rather than vertical as in the case of the cylinder condenser portion 20 of the heat pipe of FIG. 2. In other details and operating principles, the embodiment of the heat pipe disclosed in FIG. 3 is essentially similar to that shown in FIG. 2. It includes an adiabatic portion 48 surrounded by an insulating sleeve 50 and a mounting flange 52 located at points where the heat pipe is designated to pass through a furnace wall. The evaporator portion of the heat pipe is not visible in FIG. 3, but it is surrounded by a burner 54, preferably one of the recuperative type to which a fuel-mix is fed through a line 56 in which a valve 58 may be provided.

In FIG. 4, a vacuum furnace suitable for laboratory and experimental vacuum heat-treating operations is illustrated. It includes a generally cylindrical enclosure 62 which may be basically of steel and may include heat-shielding refinement. The heat-shielding or insulating qualities of the enclosure should principally be those designed to prevent heat loss by radiation. In some cases, however, it may be desired to provide a composite or layered insulation to inhibit heat loss by both conduction and radiation. The enclosure is completed by a removable top 64, which may be composed of the same materials as the body of the enclosure. Two heat pipes 66 and 68, each of which corresponds generally to that shown in FIG. 3 and described hereinabove, pass through the bottom of the enclosure 62 and include semicylindrical condenser portions 20a and 20b arranged so that their concave surfaces form a substantially complete cylindrical radiating enclosure. In the manner described in connection with the heat pipe of FIG. 2, an adiabatic portion is provided at the points of passage of the heat pipes through the wall of the enclosure 62. Also, of course, heat is applied to the evaporator portions of the two heat pipes by burners 70 and 72 which preferably surround those evaporator sections.

Beneath the bottom surface of the enclosure 62, a diffusion pump 74 is mounted. The pump 74 may be further connected by a line 76 to a forepump (not shown). A line 78 connects the interior of the enclosure 62 to the diffusion pump 74. A grid or other suitable fixture 75 supports articles to be heat-treated centrally in the enclosure 62. Shown in outline is a cylindrical volume 80 in any part of which articles may be placed in order that they may be uniformly heated to high temperatures by radiation from the concave surfaces of the condenser sections 20a and 20b. Within that volume, the radiation view factor due to the substantially complete containment of the articles disposed therein is such that temperature distribution is uniform. Also, higher temperatures and more efficient heating rates may be attained than in coventional vacuum furnaces.

In FIG. 5, a more sophisticated version of a heat pipe vacuum furnace is illustrated. In this instance, six or more heat pipes having condenser portions of the horizontal-axis type illustrated in FIG. 3 may be employed. A heat-shielding enclosure 82 having one end closed and a hinged cover 84 at the opposite end is utilized. A diffusion pump 86 communicating with the interior of the enclosure 82 through the cylindrical wall thereof produces the desired vacuum within the enclosure. Each of the condenser portions disposed within the enclosure 82 is connected by means of an adiabatic portion passing through the wall of the enclosure 82 to an evaporator portion which is surrounded by a suitable burner, all in the manner of the heat pipe of FIG. 3. The panels 26a and 26b are typical of the condenser portions employed in the furnace of FIG. 5, and they are preferably provided with ribs such as the typical rib 88. Otherwise, the major surface or surfaces of the panel may be deformed as by corrugations or dimples. A relatively long cylindrical zone of uniform high temperature distribution and high heating efficiency is created within the enclosure 82 adhacent its axis.

By placing the workpiece or articles to be heated in a central area in the enclosure and surrounding those articles by a plurality of heat pipe condenser portions in the form of cylindrical panels, the radiation view factor resulting from the substantially complete containment of the workpiece provides excellent heating rates and temperature distribution on the workpiece. Again, to further increase the efficiency of operation of the furnace. The radiating surfaces of the panels, those adjacent the articles to be heated, may be treated to enhance radiation toward the articles while the opposite surfaces, those adjacent the wall of the furnace enclosure, are preferably provided with insulation to minimize heat radiation and conduction outwardly toward the furnace wall.

The use of panel evaporators, whether singly and flat, or singly and curved in cylindrical or other shapes leads to efficient heat-flux conversion and an improved vacuum furnace. When the panels are used in multiple arrays, even greater efficiency and more uniform performance is had. Even when conventional materials are used for the heat pipe, operating temperatures as high as 2200°F can be sustained for commercially acceptable periods. However, even higher temperatures and longer life are feasible with such materials as silicon carbide.

Gas burners are the preferred sources of applied heat, but other sources of heat may be used with some sacrifice of efficiency.

What is claimed is:

1. A gaseous fossil fuel fired vacuum furnace for heating articles comprising:
   a. a heat shielded enclosure adapted to hold articles to be heated;
   b. means for facilitating the evacuation of gasses from said enclosure;
   c. heat transfer means comprising at least one heat pipe having:
      1. working fluid therein;
      2. an evaporator portion external of said enclosure;
      3. a substantially adiabatic portion extending through the wall of said enclosure;
      4. a condenser portion internal of said enclosure forming a substantially isothermal surface for radiating heat energy to articles within said enclosure; and
      5. means containing working fluid in the liquid phase and permitting movement thereof from said condenser portion to said evaporator portion; and
   d. gaseous fossil fuel fired burner means external of said enclosure for directing products of combustion onto said evaporator portion and vaporizing working fluid therein, whereby working fluid vapor from said evaporator portion condenses in said condenser portion to transfer heat energy from combustion of gaseous fossil fuel to said condenser portion for radiation therefrom to articles interior of said heat shielded enclosure.

2. A vacuum furnace as defined in claim 1 wherein said evaporator portion is disposed within said burner, said burner comprising means substantially surrounding said evaporator portion for impinging products of combustion onto substantially the entire surface of said evaporator portion therein.

3. A vacuum furnace as defined in claim 1 wherein said condenser portion is panel shaped.

4. A vacuum furnace as defined in claim 3 wherein said condenser portion surrounds a major portion of the zone of said enclosure in which said articles are held.

5. A vacuum furnace as defined in claim 3 wherein said panel is configured as a cylindrical section.

6. A vacuum furnace as defined in claim 3 wherein said panel has a major surface adjacent said articles and a major surface remote from said articles, radiation-shielding insulation being formed on said major surface of said panel remote from said articles.

7. A vacuum furnace as defined in claim 6, wherein said major surface adjacent said articles is treated to enhance radiant emissivity.

8. A fossil fuel fired vacuum furnace according to claim 6 wherein said adiabatic portion further comprises an insulating sleeve around said heat pipe inside said enclosure, adjacent the junction of said heat pipe and the enclosure wall.

9. A vacuum furnace as defined in claim 3 wherein said panel includes surfaces having their effective area and rigidity increased by predetermined deformations formed in said panel.

10. A vacuum furnace as defined in claim 3 wherein said heat transfer means comprises a plurality of said heat pipes, each of said heat pipes having a condenser portion in the configuration of a panel disposed within said furnace and adjacent such articles.

11. A vacuum furnace as defined in claim 10, wherein each of said panels is configured as a cylindrical section, said panels being disposed relative to each other and to such articles so that said panels form a cylinder substantially surrounding such articles.

* * * * *